FIP8011 OR OF 11,736
No. 11,736.
Reissued Apr. 25, 1899.
W. S. TWINING.
STREET SPRINKLER.
(Application filed July 7, 1898.)
3 Sheets—Sheet 1.
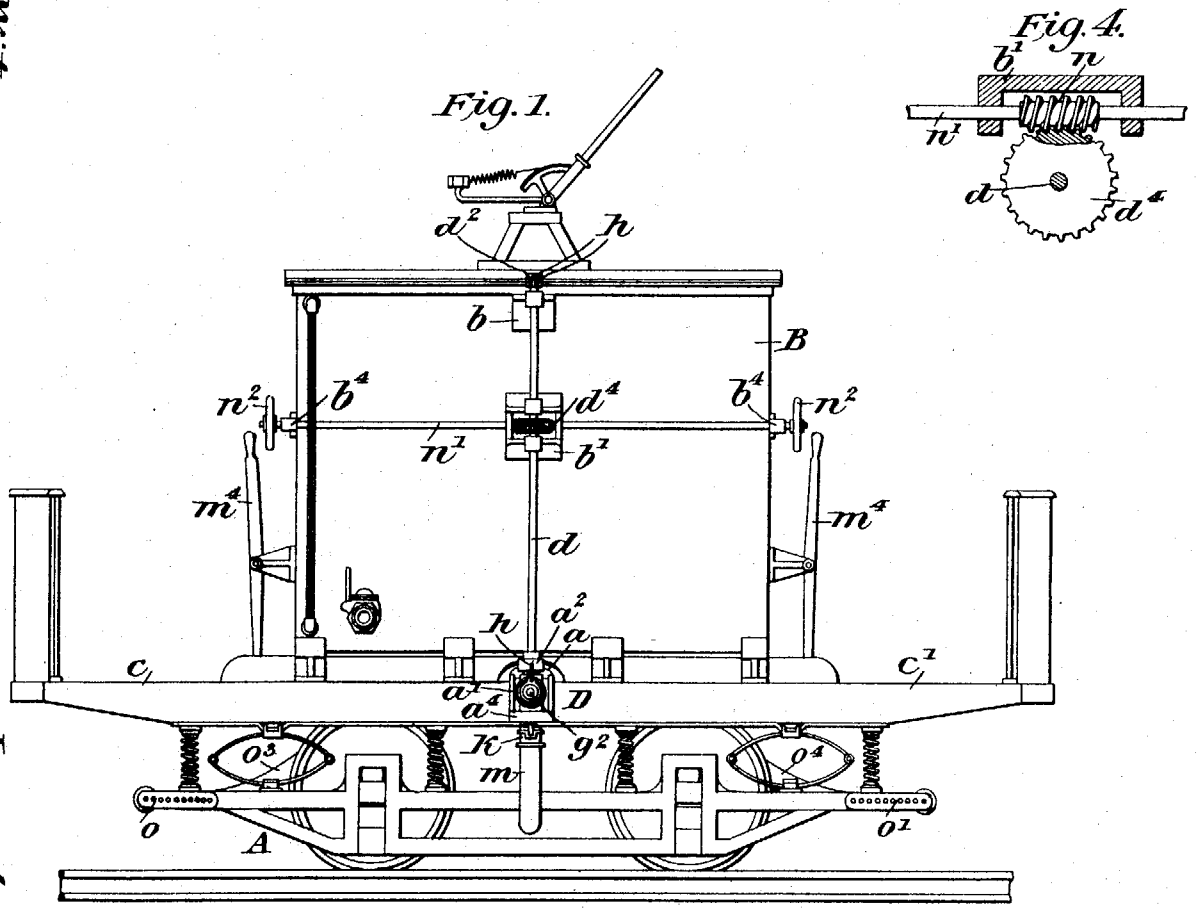
1232
X 890
Witnesses.
E. M. Haly.
Frederick P. Haubar.
Inventor:
William S. Twining
by
Smithgate & Smithgate
attorneys
THE NORRIS PETERS CO., PHOTO-LITHO., WASHINGTON, D. C.

299. FLUID S[illegible] SPRAYING & DISTRIBUTING [illegible]
No. 11,736. Reissued Apr. 25, 1899.
W. S. TWINING.
STREET SPRINKLER.
(Application filed July 7, 1898.)
3 Sheets—Sheet 2.
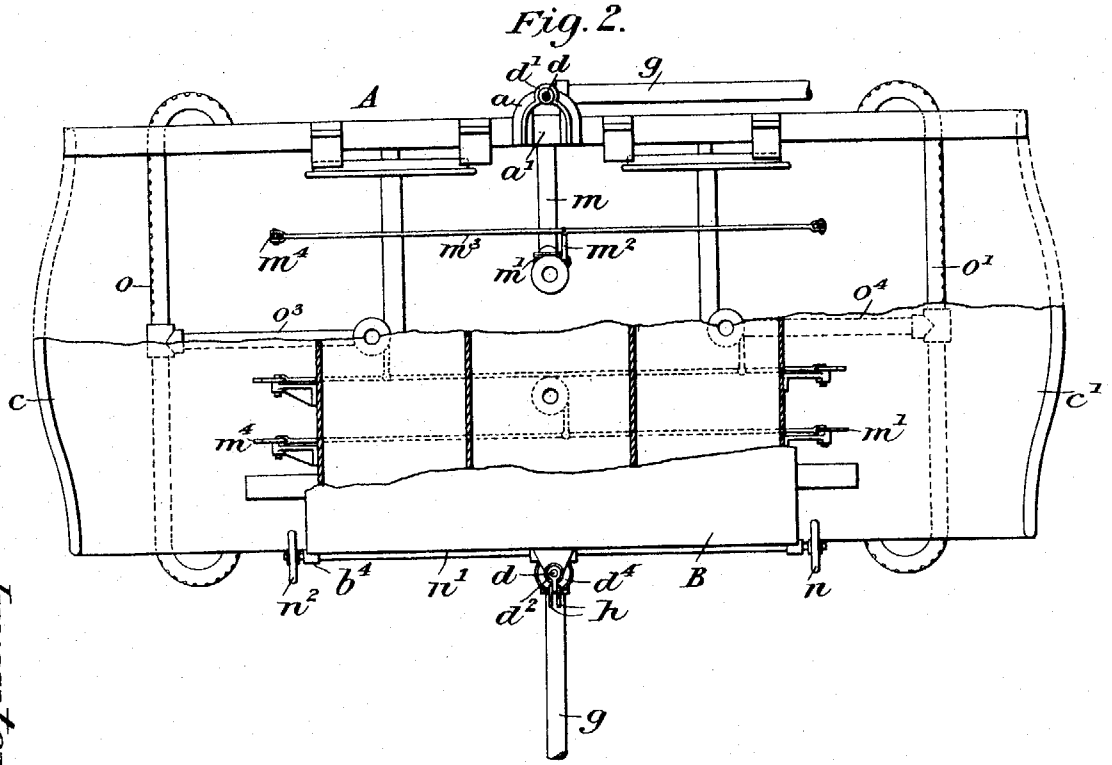
Witnesses.
E. M. Healy.
Frederick P. Harbour.
Inventor:
William S. Twining
by
Southgate & Southgate
attorneys
THE NORRIS PETERS CO., PHOTO-LITHO., WASHINGTON, D. C.

No. 11,736.
Reissued Apr. 25, 1899.
W. S. TWINING.
STREET SPRINKLER.
(Application filed July 7, 1898.)
3 Sheets—Sheet 3.
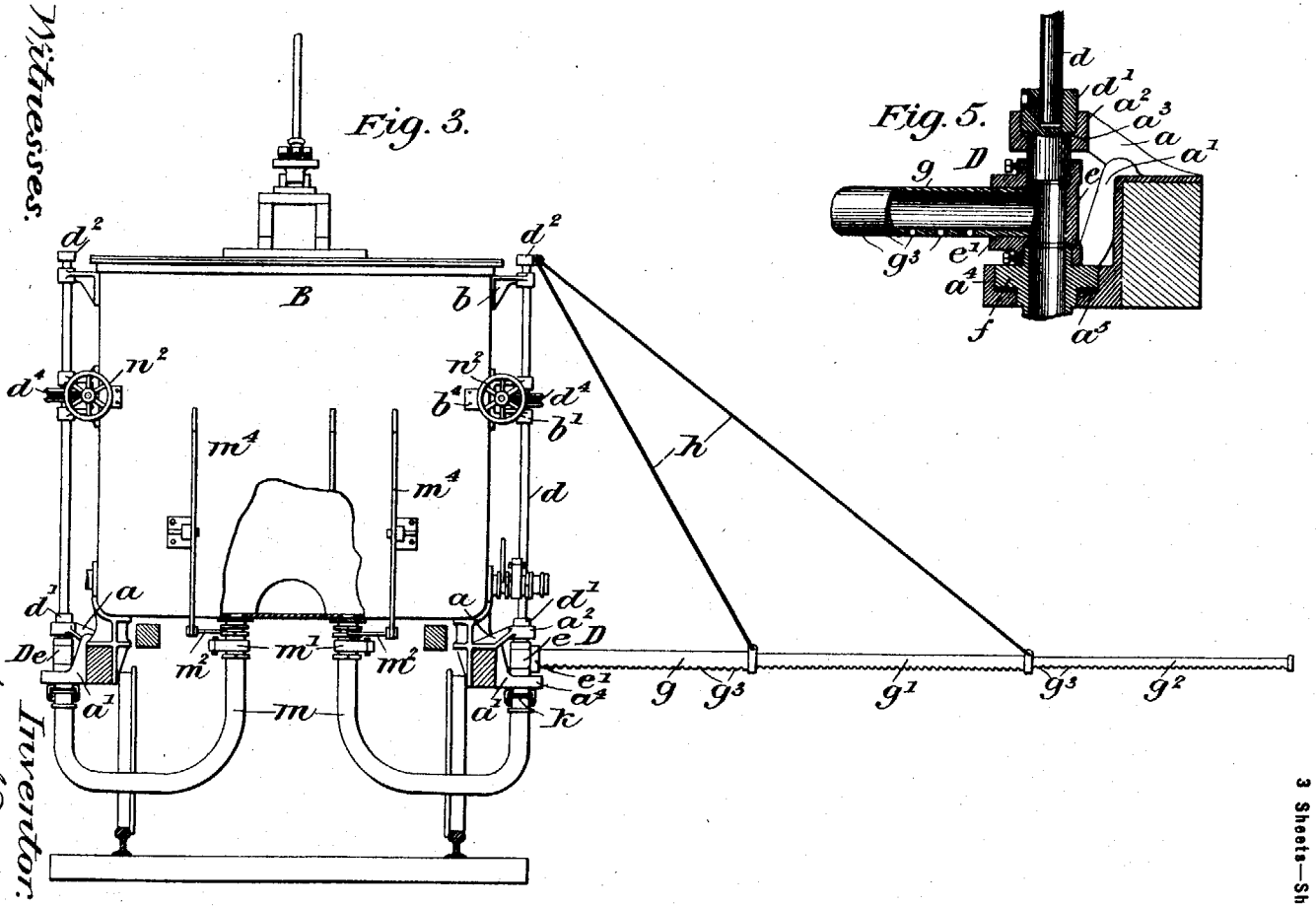
Witnesses.
E. M. Kelly.
Ludwig A. Harlow.
Inventor.
William S. Twining
by
Smithgate & Smithgate
attorneys
THE NORRIS PETERS CO., PHOTO-LITHO., WASHINGTON, D. C.

UNITED STATES PATENT OFFICE.

WILLIAM S. TWINING, OF PHILADELPHIA, PENNSYLVANIA, ASSIGNOR, BY MESNE ASSIGNMENTS, TO THE AMERICAN CAR SPRINKLER COMPANY, OF WORCESTER, MASSACHUSETTS.

STREET-SPRINKLER.

SPECIFICATION forming part of Reissued Letters Patent No. 11,736, dated April 25, 1899.

Original No. 596,669, dated January 4, 1898. Application for reissue filed July 7, 1898. Serial No. 685,353.

*To all whom it may concern:*

Be it known that I, WILLIAM S. TWINING, a citizen of the United States, residing at the city of Philadelphia, in the county of Philadelphia and State of Pennsylvania, have invented certain new and useful Improvements in Street-Sprinklers, of which the following is a specification.

My invention has relation to that class of street-sprinklers especially adapted for use upon electric, steam, or other railways to sprinkle the road-beds between and on either side of the tracks, and in such connection it relates particularly to the construction and arrangement of such a sprinkler.

The principal object of my invention is to provide a street-sprinkler adapted to travel back and forth upon a railroad-track and to sprinkle either or both sides of the streets, as well as between the tracks, when the sprinkler is traveling in either direction and without turning the sprinkler.

My invention consists in a street-sprinkler having a sprinkling-pipe constructed to sprinkle along its length suspended or supported from either side of the truck upon which the supply-tank is mounted, said pipe having a pivoted or swivel connection with the car at a point approximately intermediate of the respective ends of the trucks of the sprinkler-car and having means whereby the pipe may be swung from either end of the car through an arc of a circle approximately one hundred and eighty degrees in length.

My invention further consists of a street-sprinkler constructed and arranged in substantially the manner hereinafter described and claimed.

The nature and scope of my invention will be more fully understood from the following description, taken in connection with the accompanying drawings, forming part hereof, in which—

Figure 1 is a side elevational view of a street-sprinkler embodying main features of my invention, the sprinkler-pipe being adapted to be caused to assume a position at right angles to the side of the car or truck. Fig. 2 is a top or plan view of the same, partly broken away, with the sprinkler-pipe on one side at right angles to the car or truck and the pipe on the other side approximately parallel to said car or truck. Fig. 3 is an end elevational view of the sprinkler, partly sectioned to more clearly illustrate the valves controlling the sprinkler-pipes. Fig. 4 is an enlarged detail view illustrating the means for actuating the sprinkler-pipes, and Fig. 5 is an enlarged detail vertical sectional view of the pivoted or swivel connection between the pipes and the car or truck.

Referring to the drawings, A represents the truck, upon which the water-tank B is mounted. From either side of the truck A and midway between the end platforms $c$ and $c'$ extends a bracket D, having two arms $a$ and $a'$, the construction of which is illustrated in Fig. 5. The upper arm $a$ is extended into a horizontally-arranged eye or sleeve $a^2$, in which is formed a seat or bearing $a^3$, and the lower arm $a'$ is similarly extended into a horizontal eye or sleeve $a^4$, having a seat or bearing $a^5$. From either side of the tank B and in alinement with the eyes $a^2$ and $a^4$ extend the upper bracket $b$ and intermediate bracket $b'$, in which is pivotally supported a vertically-arranged standard $d$, the lower end of which is secured to a head $d'$, fitting in and rotating on the seat or bearing $a^3$ of the upper arm $a$ of the bracket D. To the lower end of the head $d'$ is secured a T-coupling or pipe $e$, the lower end of which is secured to a tubular head $f$, fitting in and rotating on the seat or bearing $a^5$ of the lower arm $a'$ of the bracket D. To the stem $e'$ of the coupling $e$ is secured one end of a sprinkler-pipe $g$, which, as illustrated, consists, preferably, of a series of contracting branches $g$, $g'$, and $g^2$, united to each other by a screw or other tight connection. The lower edge of each branch is perforated, as at $g^3$, and from the branches extend the tie-rods $h$, connecting the branches to the upper headed end $d^2$ of the vertical rod $d$ and adapted to support said branches in horizontal positions.

The lower end of the tubular head $f$ fits into and is adapted to turn in a coupling $k$ of ordinary construction, said coupling being formed upon or secured to one end of the water-pipe $m$, extending beneath the truck and connected with the bottom of the tank B, as illustrated in Fig. 3. The water-pipe $m$ is provided with a cut-off valve $m'$, the stem $m^2$ of which is secured to a longitudinal shifting bar $m^3$, adapted to be operated from either end of the truck by a lever $m^4$, as illustrated in Figs. 1, 2, and 3.

The intermediate bracket $b'$ on the side of the tank B is in the form of a box, and on the vertical rod $d$ within the same is secured a worm-gear $d^4$, meshing with a worm-wheel $n$, formed upon a horizontal shaft $n'$, extending longitudinally along the side of the tank and having at either end a hand-wheel $n^2$, which, with the shaft, may be turned in either direction. The shaft $n'$ has bearings in the box $b'$, as well as in additional brackets $b^4$ at the ends of the tank. Beneath the front and rear platforms $c$ and $c'$ of the truck are located fixed sprinkler-pipes $o$ and $o'$, designed to sprinkle between the rails, and these pipes $o$ and $o'$ are supplied by water-pipes $o^3$ and $o^4$, connected with the tank B and controlled by valves adapted to be operated from either end of the car in a manner similar to the valves $m'$.

In operation by turning one or both of the hand-wheels $n^2$ at either end of the car or truck a sprinkler-pipe $g$ on either or both sides of the car or truck may be swung forward or backward to occupy a position extending through an arc of a circle of one hundred and eighty degrees with respect to the side of the car or truck, and when not in use may be swung into substantially parallel position with the sides of the truck, with the free end of the sprinkler-pipe pointing either toward the front or rear platform $c$ or $c'$ of the car.

From the above description it will be readily understood that a sprinkler embodying my invention possesses many advantages, prominent among which are the following: First, by pivoting the side sprinkler-pipe substantially at the center of one side of the structure the pivot of the sprinkler-pipe is placed as far as possible from the two sets of running-gear; second, the sprinkler may travel in either direction upon the tracks without being turned, and the sprinkler-pipe may be swung into and out of use from either end of the car or truck, and, third, the sprinkler-pipe may be quickly adjusted to sprinkle a greater or less width of the street, no matter what the direction may be in which the sprinkler-car is traveling.

The standard $d$ and tie-rods always support the sprinkler-pipe in horizontal position, the weight of the pipe falling upon the tank and not upon the swivel connection with the truck or car. Hence the pipe may be more easily and quickly manipulated about its pivotal support.

Having thus described the nature and objects of my invention, what I claim as new, and desire to secure by Letters Patent, is—

1. In a sprinkler-car, the combination of a truck, a supply-tank mounted thereon, and a sprinkler-pipe constructed to sprinkle along its length, the inner end of the sprinkler-pipe being pivotally supported substantially at the side of the truck midway of its length, substantially as described.

2. In a sprinkler-car, the combination of the truck, a supply-tank mounted thereon, an end platform, a side sprinkler-pipe connected to said tank and pivoted at the side of the tank or truck between its ends at a distance from said platform, and means extending from said platform for turning said sprinkler-pipe on its pivot, substantially as described.

3. In a sprinkler-car, the combination of the truck, a supply-tank mounted thereon, a platform at each end of the car, a side sprinkler-pipe connected to said tank, and pivoted to the side of said structure at the substantial center thereof, and means extending from each platform for turning said sprinkler-pipe on its pivot, substantially as described.

4. In a street-splinkler, the combination with a truck and a water-tank mounted thereon, of a sprinkler-pipe flexibly connected with said tank and pivotally connected with the truck intermediate of the ends thereof, and means, substantially as described adapted to be operated at both ends of said truck, whereby the sprinkler-pipe may be swung through an arc of one hundred and eighty degrees about the side of the truck, substantially as and for the purposes described.

5. In a street-sprinkler, the combination with a truck and a water-tank mounted thereon, of a sprinkler-pipe flexibly connected with said tank and pivotally supported on the side thereof midway of its ends, a vertical rod or standard adapted to turn in suitable bearings on the side of the tank and connected at its lower end with the pivotal connection of the sprinkler-pipe, tie-rods adapted to secure the free end of the sprinkler-pipe to the top of the standard, and means, substantially as described and adapted to be operated from both ends of the truck for turning the standard, whereby the sprinkler-pipe may be swung through an arc of one hundred and eighty degrees in either direction about the side of the truck, substantially as and for the purposes described.

6. In a street-sprinkler, the combination with a truck and a water-tank mounted thereon, of a sprinkler-pipe, a bracket projecting from the side of the truck intermediate of its ends, a T-coupling pivoted in said bracket and secured to the sprinkler-pipe, a standard pivotally supported on the sides of the tank and connected at its lower end with the T-coupling, a worm-gear secured to said standard, a worm-wheel meshing with said gear, a shaft to which said worm is secured and extending along either side of the tank, and a hand-wheel secured to either end of said shaft and adapted to be operated from the respective ends of said truck, substantially as and for the purposes described.

In testimony whereof I have hereunto set my signature in the presence of two subscribing witnesses.

WILLIAM S. TWINING.

Witnesses:

J. WALTER DOUGLASS,
THOMAS M. SMITH.